US008385669B2

(12) United States Patent
Gerhard et al.

(10) Patent No.: US 8,385,669 B2
(45) Date of Patent: Feb. 26, 2013

(54) SCALABLE MUTABLE TILED MULTI-RESOLUTION TEXTURE ATLASES

(75) Inventors: Lutz Gerhard, Seattle, WA (US); Adam Szoforan, Seattle, WA (US); Radoslav Nickolov, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 837 days.

(21) Appl. No.: 12/397,848

(22) Filed: Mar. 4, 2009

(65) Prior Publication Data

US 2010/0226593 A1 Sep. 9, 2010

(51) Int. Cl.
G06K 9/46 (2006.01)
(52) U.S. Cl. ........ 382/249; 382/294; 382/295; 382/298; 382/299; 382/302; 382/305; 345/552
(58) Field of Classification Search .................. 382/249, 382/302, 24, 294–295, 298–299, 305; 345/552
See application file for complete search history.

(56) References Cited

U.S. PATENT DOCUMENTS

| 6,011,872 | A * | 1/2000 | Qian et al. ..................... 382/243 |
| 6,122,634 | A * | 9/2000 | Brodsky ................................ 1/1 |
| 6,184,888 | B1 * | 2/2001 | Yuasa et al. .................... 345/419 |
| 6,239,807 | B1 * | 5/2001 | Bossut ........................... 345/582 |
| 6,647,125 | B2 * | 11/2003 | Matsumoto et al. .......... 382/100 |
| 7,257,250 | B2 | 8/2007 | Boier-Martin et al. |
| 7,262,769 | B2 | 8/2007 | Hoppe et al. |
| 7,283,140 | B2 | 10/2007 | Zhou et al. |
| 7,397,480 | B2 | 7/2008 | Spicer |
| 2001/0041014 | A1 * | 11/2001 | Kaneda .......................... 382/239 |
| 2002/0018072 | A1 * | 2/2002 | Chui ............................... 345/667 |
| 2003/0086616 | A1 * | 5/2003 | Oh et al. ......................... 382/209 |
| 2006/0176305 | A1 | 8/2006 | Arcas et al. |
| 2007/0018988 | A1 | 1/2007 | Guthe |
| 2007/0146378 | A1 * | 6/2007 | Sorgard et al. ................ 345/581 |
| 2008/0001962 | A1 | 1/2008 | Lefebvre et al. |
| 2008/0050047 | A1 * | 2/2008 | Bashyam et al. ............. 382/305 |
| 2009/0317010 | A1 * | 12/2009 | Gerhard et al. ............... 382/240 |

OTHER PUBLICATIONS

Visual realism—Internet, Blumberg et al., 1063-6390, IEEE, 1997, pp. 269-273.*
Nonlinear array—system, Chatterjee et al., 1-58113-164, ACM, 1999, pp. 444-451.*
Visual realism—Internet., Blumberg et al., 1063-6390, IEEE, 1997, pp. 269-273.*
Cignoni, et al., "Ray-Casted BlockMaps for Large Urban Models Visualization", Retrieved at <<http://vcg.isti.cnr.it/Publications/2007/CDGGMS07/BlockMaps_EG07.pdf>>, EUROGRAPHICS 2007, vol. 26 (2007), No. 3, 9 pages.

(Continued)

Primary Examiner — Jayesh A Patel
(74) Attorney, Agent, or Firm — The Law Office of Michael E. Kondoudis (57) ABSTRACT

Functionality for storing and modifying multi-resolution texture atlases is provided so that applications can expose methods to enable users to access and browse a collection that includes multiple multi-resolution images. The images are stored as thumbnails in a texture atlas having different levels of detail in which the levels are arranged in an image pyramid that includes multiple tiles that are each stored as separate files. The thumbnails are spatially storable as textures in the texture atlas using a fractal layout (which in one illustrative example is a Morton layout) that enables images to be efficiently packed in the tiles. The fractal layout ensures that no more than one tile stores less than a fully packed texture at each level of detail. The same packing order scales across each level of detail in the texture atlas so that layout information is stored for the individual images in the collection only once.

15 Claims, 9 Drawing Sheets

OTHER PUBLICATIONS

Sorkine, et al., "Bounded-Distortion Piecewise Mesh Parameterization", Retrieved at <<http://www.cs.tau.ac.il/~dcor/online_papers/papers/sorkine02.pdf>>, date unknown, but prior to the filing date of the instant application, 8 pages.

Kim, et al., "Multiresolution Model Generation with Geometry and Texture", Retrieved at http://hci.kaist.ac.kr/publication/proceed_int/likidas01/VSMM2001.pdf>>, date unknown, but prior to the filing date of the instant application, 10 pages.

Zhou, et al., "Iso-Charts: Stretch-Driven Mesh Parameterization using Spectral Analysis", Retrieved at <<http://research.microsoft.com/~johnsny/papers/isochart.pdf>>, Eurographics Symposium on Geometry Processing (2004), 10 pages.

Botsch, et al., "An Intuitive Framework for Real-Time Freeform Modeling", Retrieved at <<http://www-i8.informatik.rwth-aachen.de/uploads/media/modeling.pdf>>, date unknown, but prior to the filing date of the instant application, 5 pages.

Author Unknown, "FlashPix Format Specification" Version 1.0, dated Sep. 11, 1996, 140 pages.

Author Unknown, "Deep Zoom File Format Overview" Copyright 2012 Microsoft Corporation, downloaded at http://msdn.microsoft.com/en-us/library/cc645077(v=vs.95).aspx, 6 pages.

Author Unknown, "Peeking into the Wikipedia Dynamic Pivot Collection" downloaded at: http://computersforfood.wordpress.com/2010/01/15/peeking-into-the-wikipedia-dynamic-pivot-collection/, Posted on Jan. 15, 2010, 5 pages.

\* cited by examiner

| Level | Image Dimension (pixels) |
|---|---|
| Level 0 | 1 x 1 |
| Level 1 | 2 x 2 |
| Level 2 | 4 x 4 |
| Level 3 | 8 x 8 |
| ⋮ | ⋮ |
| Level N | $2^N \times 2^N$ |

SCALABLE MUTABLE TILED MULTI-RESOLUTION TEXTURE ATLASES

BACKGROUND

As global broadband penetration continues to rise, consumers are increasingly empowered to enjoy high fidelity media and rich interactive applications on the Web. Providers often use interactive applications to deliver comprehensive user experiences to both consumers and enterprises in an effort to enhance revenues and operating margins. Thus, application providers are finding it increasingly important to deliver differentiated user experiences across a variety of channels—including mobile, Web, and desktop—in order to attract new customers and retain existing ones. Application users are typically more discerning than ever in the content or the services they choose to consume. They also want compelling user experiences that are quickly and smoothly delivered and responsive to user control and inputs.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Functionality for storing and modifying multi-resolution texture atlases is provided so that applications can expose methods to enable users to access and browse a collection that includes a set of multi-resolution images. The images are stored as thumbnails in a texture atlas having different levels of detail in which the levels are arranged in an image pyramid that includes multiple tiles which are each stored as separate files. At the top of the pyramid, the thumbnail images have the lowest resolution and are typically packed into a single tile. In the middle levels of the pyramid, the thumbnails have more detail and will share tiles, but multiple tiles can be used to store all of the images in the collection. At the bottom level of the pyramid, the images have their greatest level of detail and are typically unpacked so that each image will occupy one tile.

The thumbnail images are spatially stored as textures in the texture atlas on a server using a fractal layout (which in one illustrative example may comprise a Morton layout) that enables images to be efficiently packed in the tiles. The fractal layout ensures that no more than one tile stores less than a fully packed texture at each level of detail. The same packing order scales across each level of detail in the texture atlas so that layout information is stored for the individual images in the collection only once using metadata comprising, for example, a Morton number (i.e., an ordinal which indicates an image's position in the layout) and an aspect ratio (i.e., ratio of image width to height).

An application uses the metadata to store the thumbnail images in the collection on a server so that specific images in the collection (e.g., those being browsed by an application user) can be downloaded to a client device and rendered on a display. Rather than fetching the entire set of tiles, only the relevant subset of tiles needed to render the specific images has to be downloaded from the server. Thumbnails can be located on the tile and cropped out using the information contained in the metadata and then handled as individual images so that the appropriate display may be composed and rendered.

The scalable mutable tiled multi-resolution texture atlases advantageously enable applications to support rich user experiences when dealing with image collections that may be large and which could include thousands or even millions of images in some implementations. Normally, browsing a large collection is less than an ideal experience for a user because there can be a considerable time lag as the collection loads from the server. In particular, downloading a collection as individual images can result in thousands of separate file requests which is a sub-optimal process for commonly used file transfer protocols such as HTTP (HyperText Transfer Protocol).

The texture atlas can mitigate such difficulties by minimizing the metadata needed to store collections of multi-resolution images which allows even very large collections to open fast on the client device. In addition, the present texture atlases are mutable and may be modified so that thumbnail images are added or removed from a collection. When a new image is added, it is positioned in the fractal layout at the next available location. When an image is deleted from the collection, its position in the layout is marked as open. Utilization of these techniques enables a texture atlas to be managed dynamically and without needing to be rebuilt each time a collection is modified with new or deleted images. In addition, because a fractal layout (e.g., a Morton layout) is utilized, the addition or deletion of images from the collection can be performed in constant time (i.e., irrespective of the size of the collection).

In an illustrative embodiment, the entire collection can be quickly loaded from the server by a rendering engine running on the client device and displayed as low resolution thumbnails using a small amount of data from a single tile. In addition, as only a minimal amount of metadata is needed to store and dynamically manage the collection, the data transferred from the server to the client on application startup is further reduced.

As the user zooms in to browse a particular part of the collection, the rendering engine loads additional tiles containing higher resolution thumbnails from the server. This results in further bandwidth savings because only some of the tiles from the texture atlas that are needed to render the particular images of interest have to be loaded. The fractal layout provides efficient packing of images to minimize wasted space due to empty tiles while enabling the collection to be quickly dynamically modified when images are added or deleted from a collection.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Like reference numerals indicate like elements in the drawings. Elements are not drawn to scale unless otherwise indicated.

DETAILED DESCRIPTION

Figure 1:
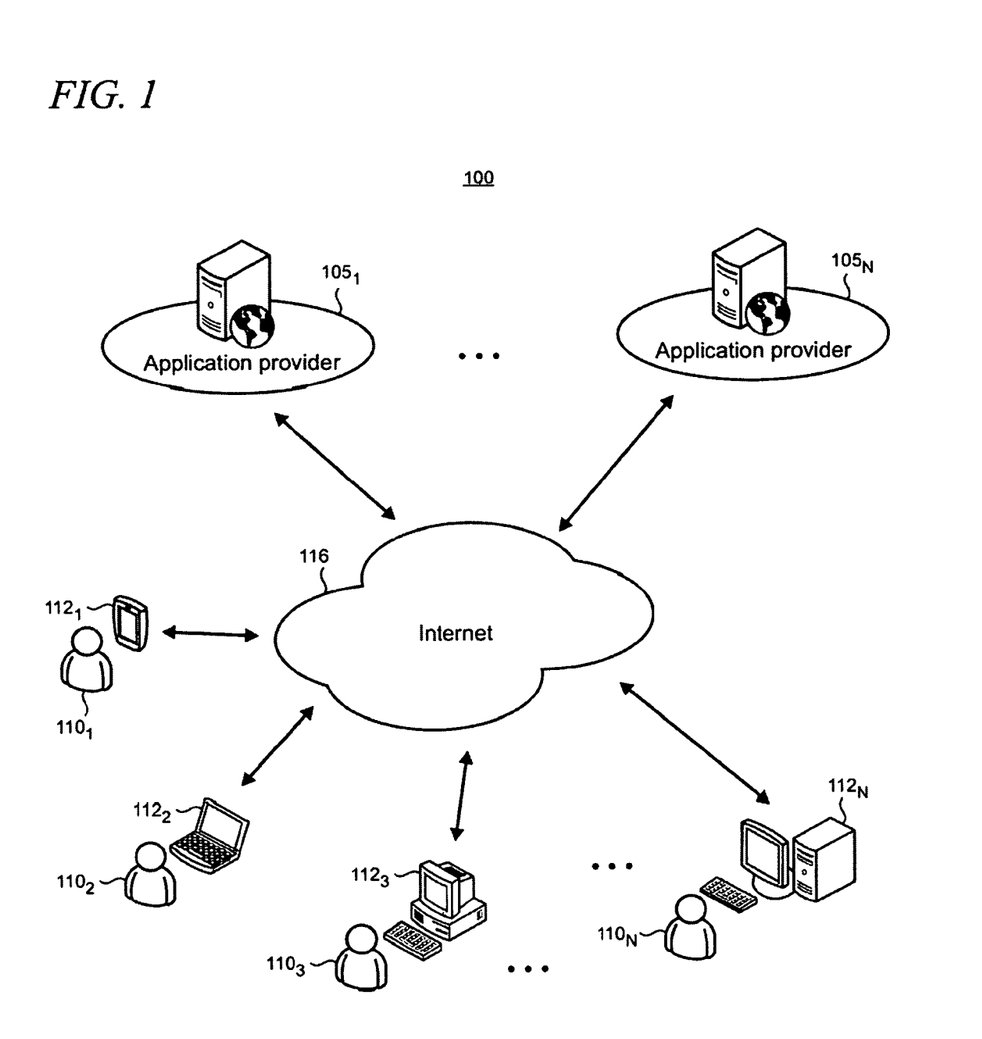
FIG. 1 shows an illustrative computing environment which includes users at client devices that are connected to application providers over a network.

FIG. 1 shows an illustrative on-line environment 100 that supports a number of application providers $105_{1 \ldots N}$ and users $110_{1, 2 \ldots N}$ at respective client devices $112_{1, 2 \ldots N}$ that are each arranged with connectivity to a public network such as the Internet 116. The client devices 112 may comprise, for example, workstations, desktop and laptop PCs (personal computers), as well as portable devices such as mobile phones, media players, handheld PCs and game players, and the like that have network connectivity and web browsing capabilities. It is emphasized that the client devices shown in FIG. 1 are intended to be illustrative and that other devices may be utilized with the present scalable mutable tiled multi-resolution texture atlases as may be required to meet the needs of a particular implementation.

Figure 2:
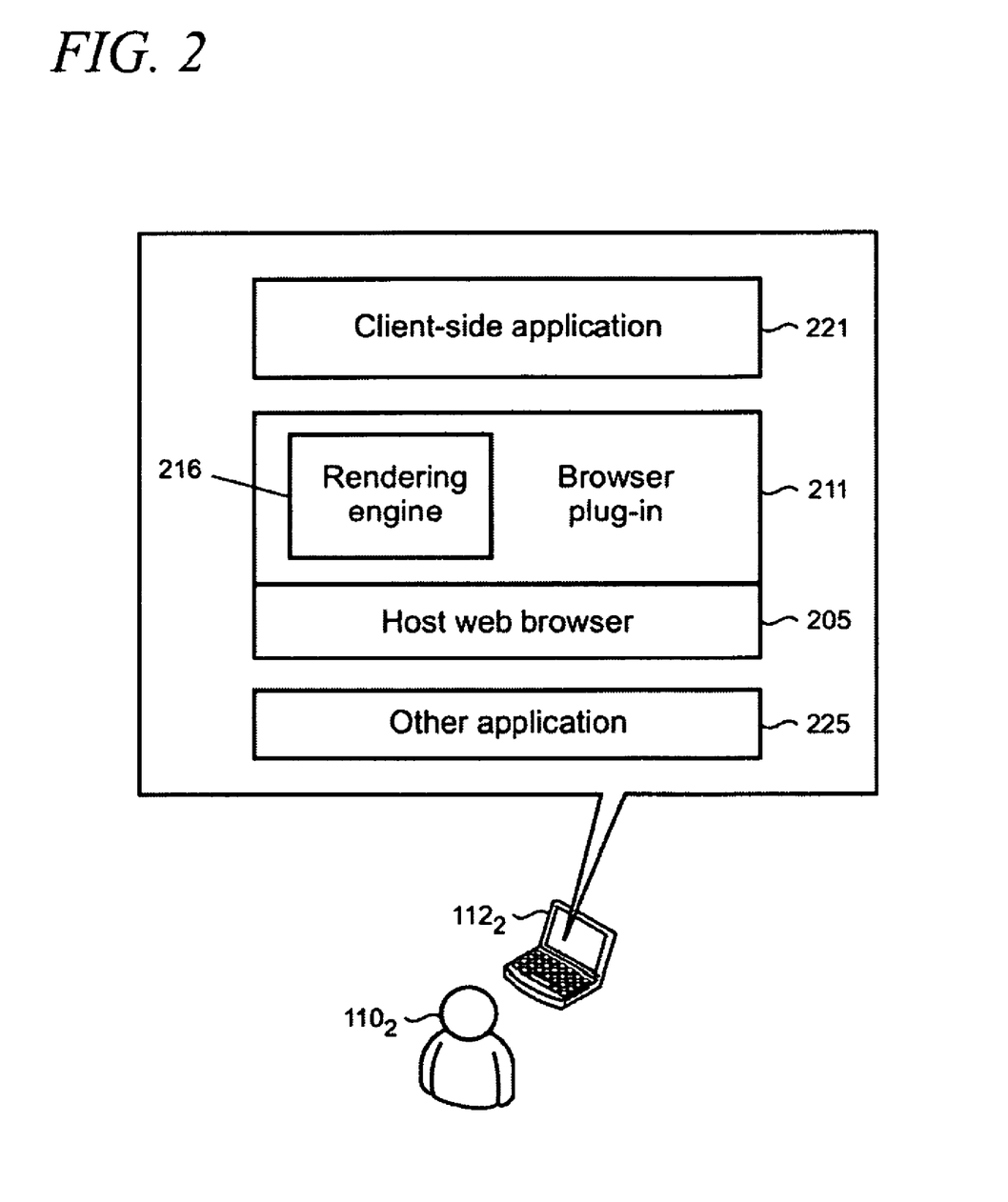
FIG. 2 shows a set of illustrative components that may run on a client device.

In this example, the application providers 105 support web-based user experiences. While the specific user experiences can vary by implementation, the applications 105 will typically support rich graphics and user interaction through a browser that runs on a client device 112. As shown in FIG. 2, a host web browser 205 may be configured with a plug-in 211 to implement a graphics rendering engine 216 that executes on the client device (represented by a laptop PC $112_2$ in FIG. 2).

For example, the browser plug-in 211 may be embodied by Microsoft Corporation's Silverlight™ cross-browser, cross-platform plug-in. The rendering engine 216 functions to fetch stored images from a server at the application provider 105 and render the images responsively to input from a user 110, as described in more detail below. In alternative implementations, the rendering engine functionality can also be implemented using a client-side application 221 on the device 112 or some other application 225.

FIGS. 3-6 show one particular illustrative embodiment of the present scalable mutable tiled multi-resolution texture atlases. In this example, a user experience is supported by an application provider 105 which comprises browsing an on-line collection of images that depict various historical pieces, memorabilia, and other items that might be held by a museum or similar institution. It is emphasized that the user experience shown and described is intended to be illustrative and that the present multi-resolution texture atlases should not be viewed as being limited to only such experiences.

Figure 3:
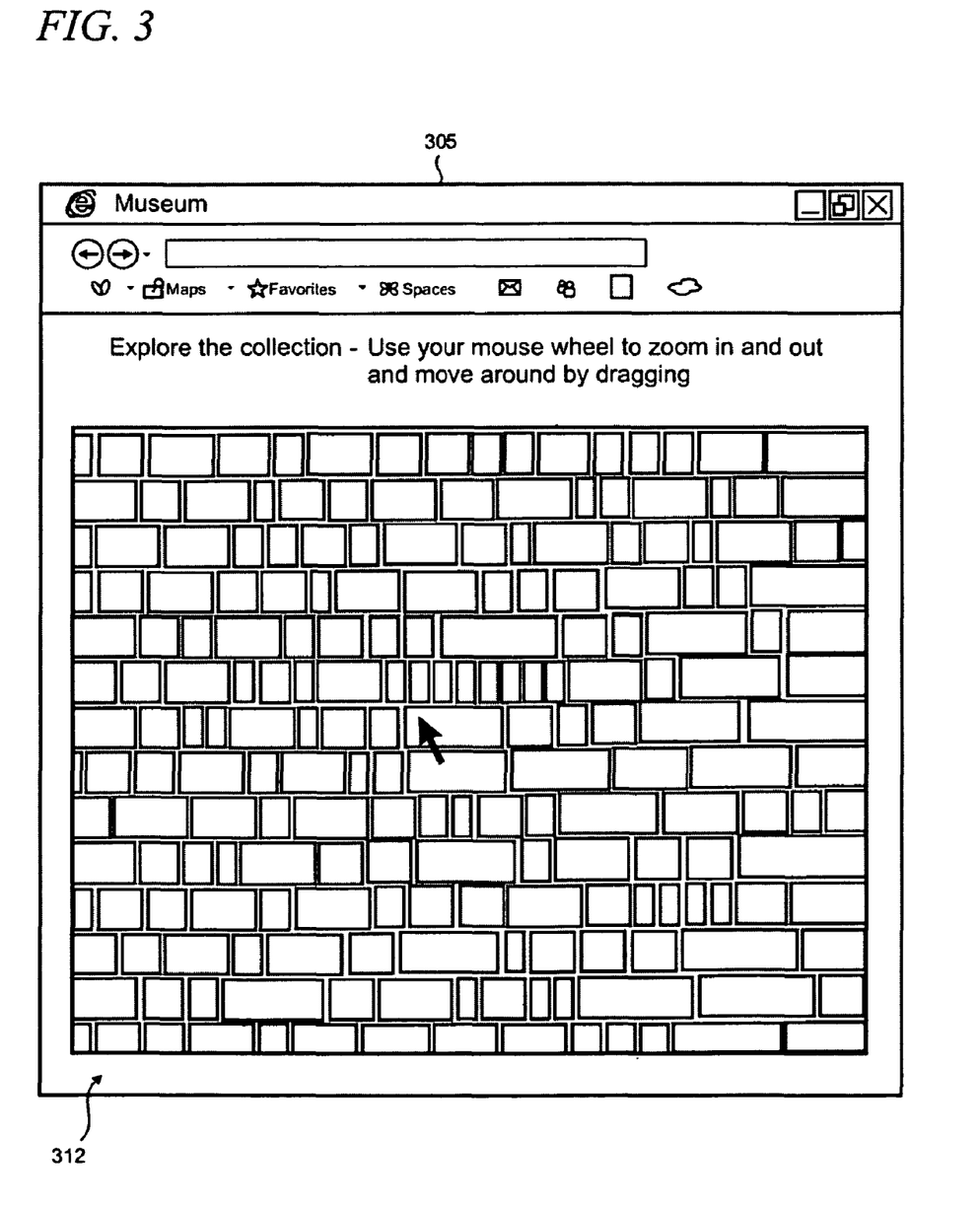
FIGS. 3-6 show an illustrative example of a user experience in which a collection of images is browsed using a zoom feature.

As shown in FIG. 3, the user experience is Web-based and the application is configured to enable a user 110 to initially see a mosaic image of all the pieces in the museum's collection in a browser window 305. Note that for the sake of clarity in illustration, only the rectangular borders of a multiplicity of thumbnail images 312 are shown in the drawings.

Figure 4:
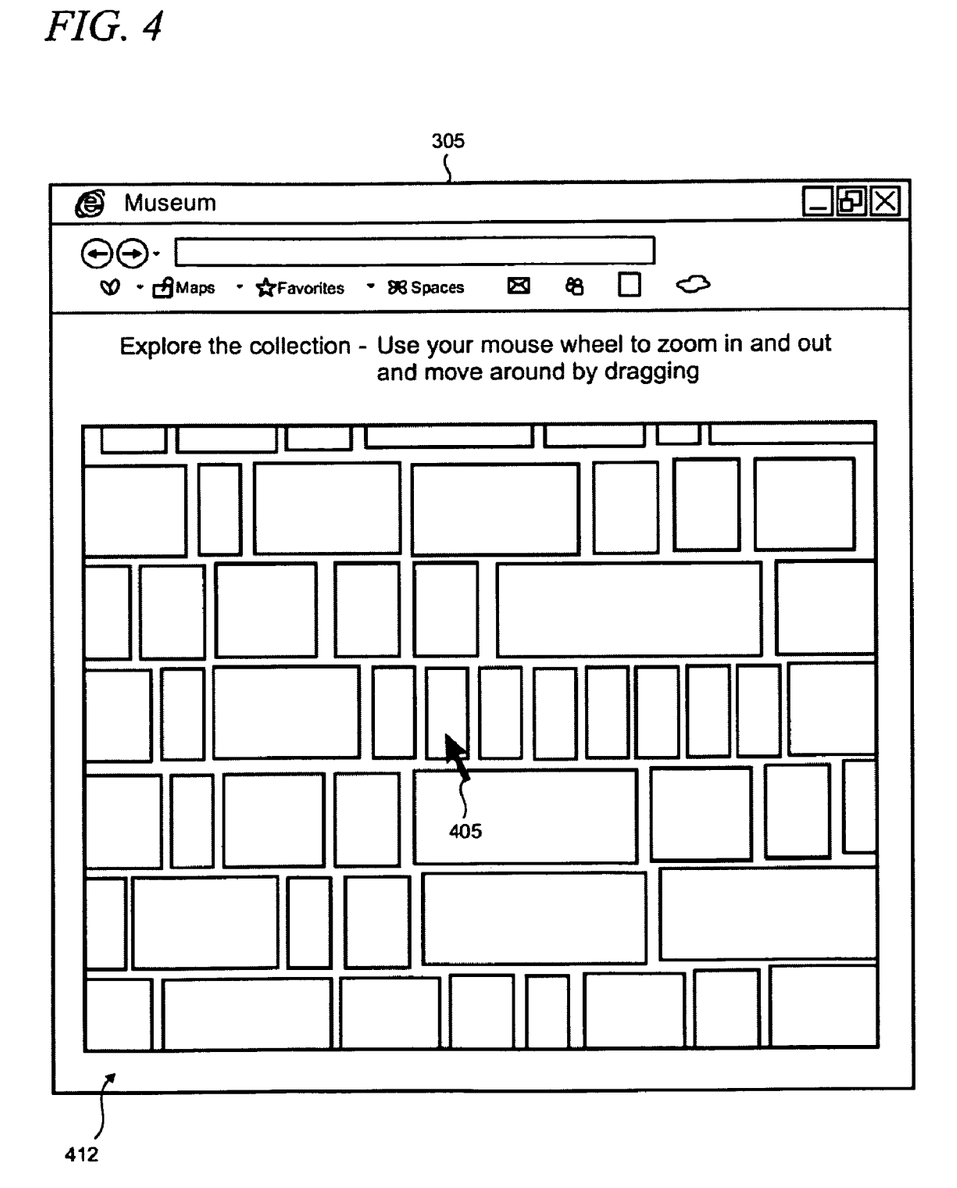

As shown in FIG. 4, the user 110 can zoom in to make a selected subset of thumbnails 412 bigger to see more details about specific pieces in the museum's collection at higher resolutions (again for the sake of clarity, only the borders of the thumbnails are depicted in the drawing). In this example, the user can position the cursor 405 and use the scroll wheel on a mouse to effectuate the zoom on the selected subset of thumbnails in the collection. However, it is noted that other user interfaces and devices can also be utilized.

Figure 5:
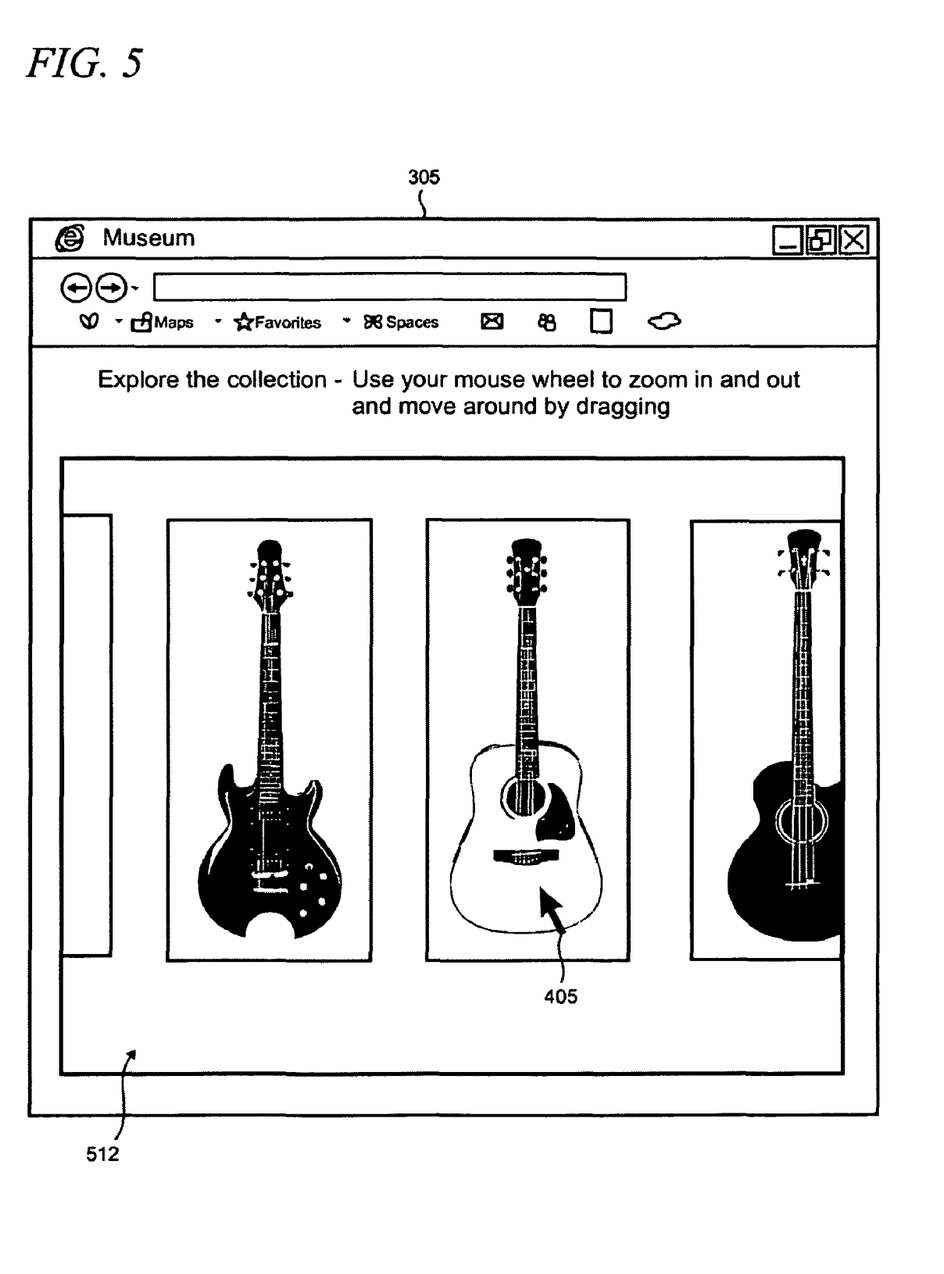

FIG. 5 shows how the user 110 can continue to zoom in so that a selected image or group of images 512 will substantially fill the browser's window (here, the drawing shows details of the thumbnail images of musical instruments in the collection). It is noted that the user 110 could continue to zoom in beyond that shown in FIG. 5 to see additional details of a particular portion, for example, of one of the musical instruments.

Figure 6:
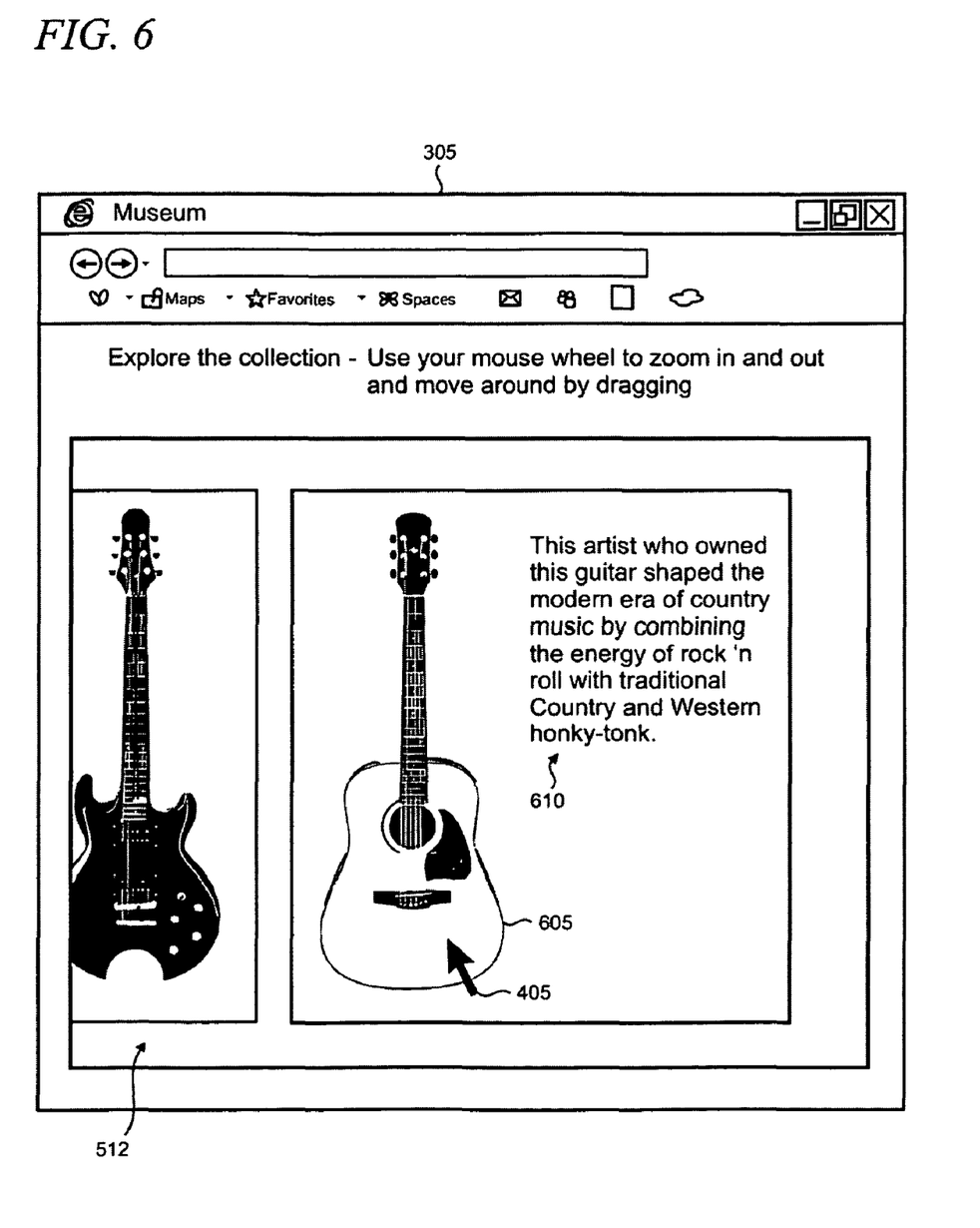

As shown in FIG. 6, the application allows the user 110 to click on an image 605 to bring up a brief textual description 610 of the item that is shown. In alternative examples, clicking on an image could trigger sound, music, multimedia, links to other images, and the like.

Figure 7:
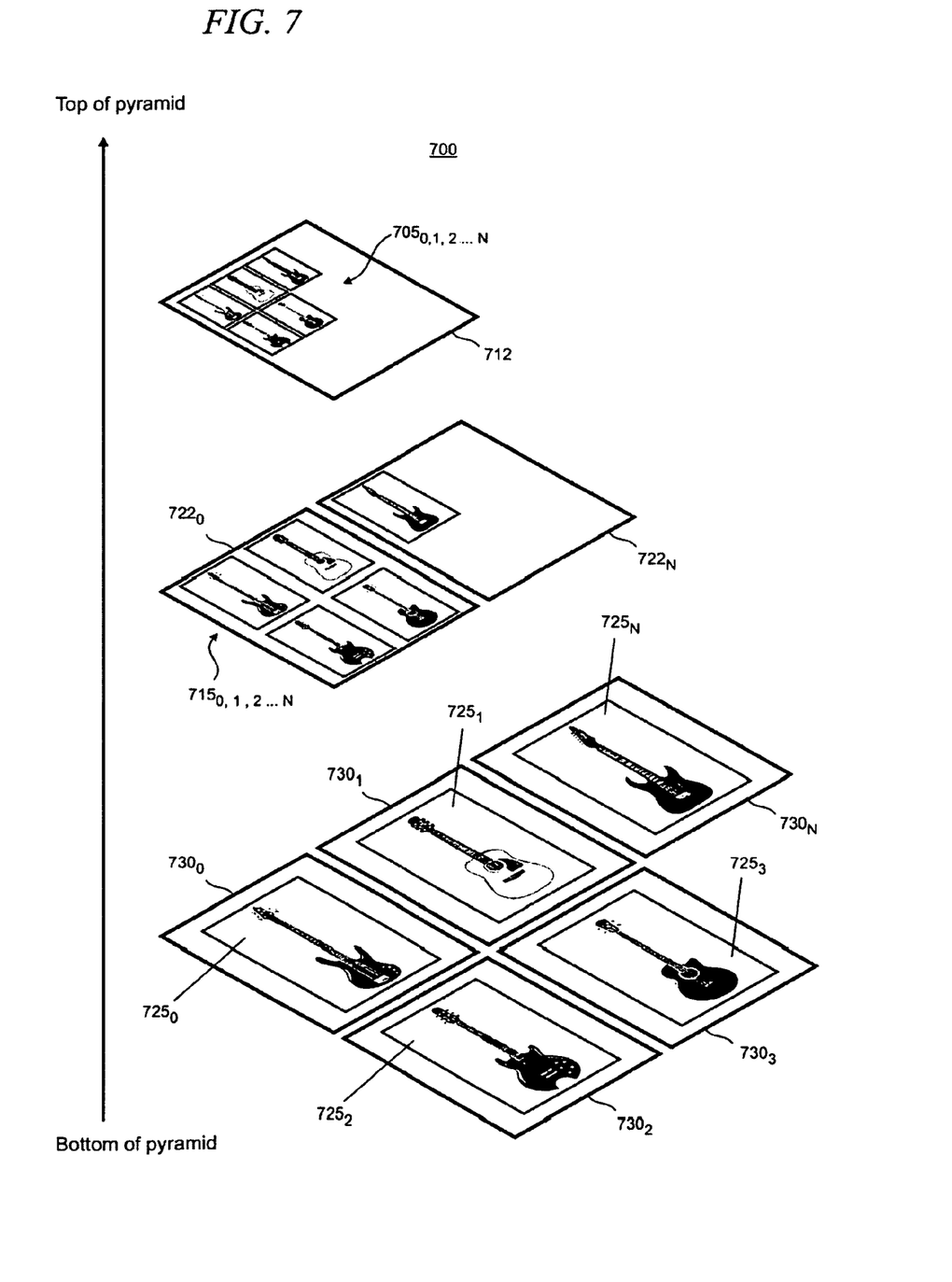
FIG. 7 shows an illustrative image pyramid which uses tiles to store images as textures in a texture atlas.

To support the illustrative user experience shown in FIGS. 3-6 and described in the accompanying text, the thumbnail images of the items in the collection are stored in a tiled image pyramid. An illustrative example of a tiled image pyramid 700 is shown in FIG. 7. The image pyramid 700 has multiple levels where each level contains all of the thumbnail images in the collection but at different levels of resolution. Thus, for example, a given image will comprise multiple sub-images where each of the sub-images show the same content but are sized differently and will thus exhibit different amounts of resolution.

For purposes of clarity in exposition, only a small subset of the thumbnail images that make up the collection used in the museum example above are shown in the image pyramid 700 using three levels. However, it is emphasized that a given collection may contain level 0 up to some maximum level ("maxlevel") as needed to store all the images in the collection at the various desired levels of detail. Thus, the concepts described in this example are equally applicable to collections that may have hundreds, thousands, or even millions of images using a multiplicity of levels.

Towards the top of the image pyramid 700 at level 0, the thumbnail images $705_{0 \ldots N}$ are typically packed into a single, shared tile 712. Each tile will further be typically stored as a separate file using conventional file formats for images. For example, but not by way of limitation, JPEG (Joint Photographic Experts Group), PNG (Portable Network Graphics), or other known formats may be utilized. In this example, each of the tiles in the image pyramid is 256×256 pixels. However, it is emphasized that other tile sizes and files formats can be utilized as necessary to meet the requirements of a particular application.

The thumbnail images will have the smallest dimensions and lowest resolution at level 0 in the pyramid, for example, 1×1 pixels. In the middle of the image pyramid 700, the thumbnail images $715_{0, 1, 2 \ldots N}$ will still share tiles $722_{0, 1, 2 \ldots N}$, but multiple tiles will typically be needed to contain all the images in the collection. The thumbnail images in the middle levels are larger in size compared with images in the levels towards the top of the pyramid. At the bottom level of the image pyramid 700, the thumbnail images $725_{0, 1, 2 \ldots N}$ are the largest in size with the greatest amount of detail, and are typically unpacked so that each image will occupy one of the tiles $730_{0, 1, 2 \ldots N}$.

Storing the thumbnail images using the tiled texture atlases can enable fast access to images because semantically related images, which can frequently share tiles, can be downloaded from the server with fewer roundtrips and the rendering engine 216 (FIG. 2) can implement less decoding to render the display for the user. Thus, for example, when the thumbnail images are relatively small, as in FIGS. 3 and 4, only a relatively small number of tiles need to be downloaded to compose and render the desired display at the client device 112.

Figure 8:
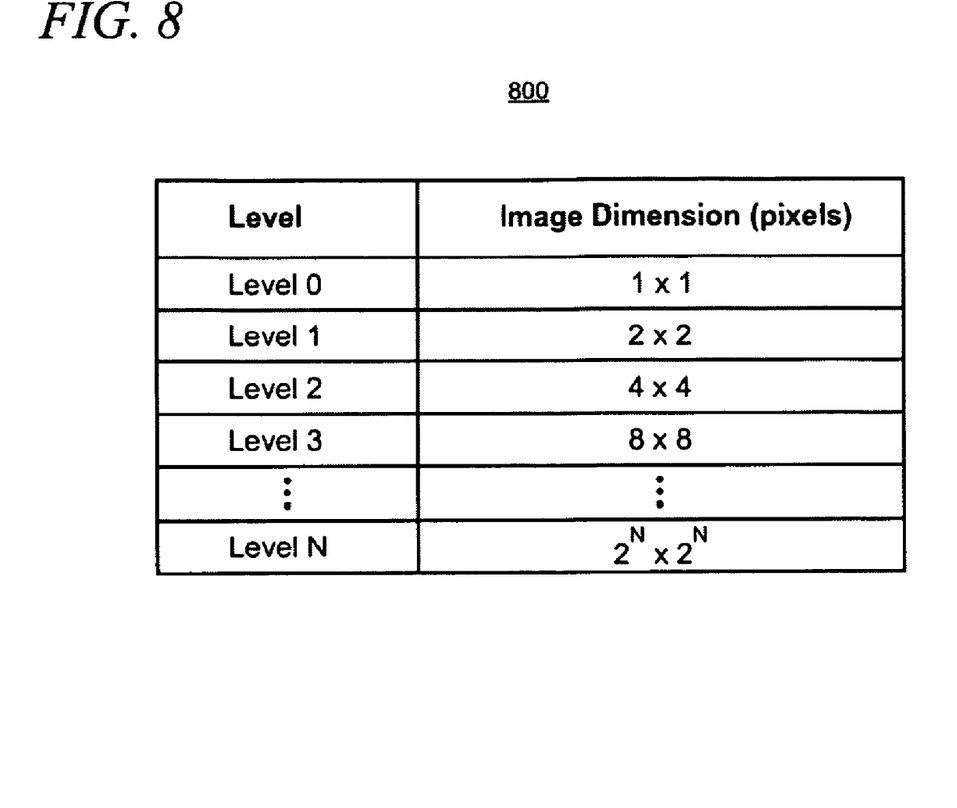
FIG. 8 shows an illustrative set of levels that store images at various levels of detail.

As shown in table 800 in FIG. 8, each level of the image pyramid is described by a level number that refers to the size of the thumbnail image in the tiles. Here for example $2^{level\ no.}$=image dimension. Thus, at level 0 at the top of the image pyramid, each thumbnail image is sized at $2^0 \times 2^0$ pixels (i.e., 1×1), while at level 1 the image size is 2×2 pixels, at level 2, the image size is 4×4 pixels, and so forth. Accordingly, the tile size must be greater than or equal to $2^{maxlevel}$. It is noted that the levels of detail shown in example in FIG. 8 are intended to be illustrative and that other levels of may be utilized as necessary to meet the requirements of a particular application.

Figure 9:
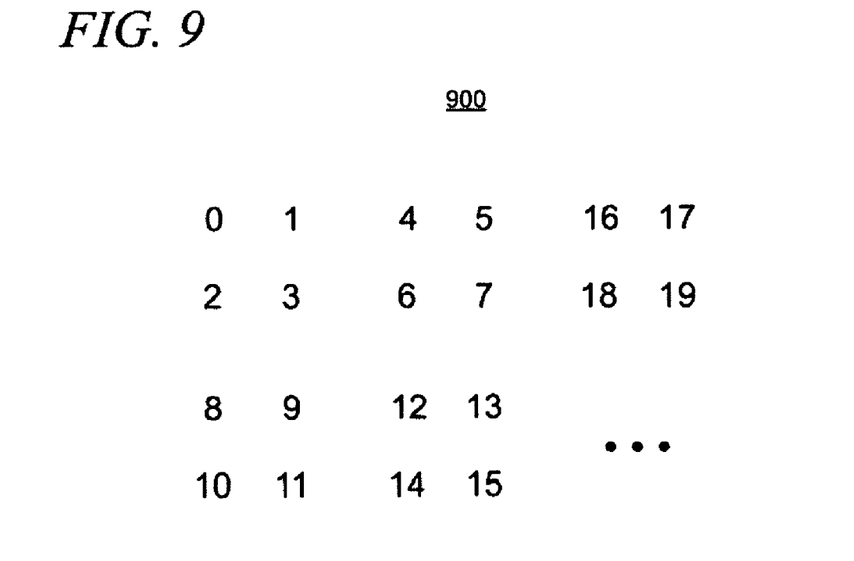
FIG. 9 shows an illustrative spatial layout for storing images in the collection.

As shown in FIG. 9, the thumbnail images in a collection are spatially stored as textures in a texture atlas using a fractal layout. In this illustrative example a specific fractal layout 900 is utilized (which is commonly known as a "Morton" layout), although other fractal layouts may be used in alternative implementations. The layout 900 can be extended as needed to accommodate any collection size. Significantly, the layout provides that the same packing ordering for the thumbnail images is utilized at each level and resolution. Therefore, a single Morton number, or ordinal, will uniquely describe the position of a thumbnail image at every level of detail. That is, the Morton layout only needs to store layout information once for each item in the collection. In addition, by being fractal in nature, the Morton layout ensures that no more than one tile at each level stores less than a fully packed texture. Efficient utilization of file space further enhances the responsiveness of the user experience by reducing the bandwidth requirements between the client device and service.

The location in the Morton layout is calculated for the Nth image in a collection by separating the odd and even bits of N to find the appropriate row and column. So for example, for the $5^{th}$ thumbnail image, $5_{10}=101_2$ which is separated into odd and even bits, $11_2=3_{10}$ and $0_2=0_{10}$, the image is stored in the $3^{rd}$ column and $0^{th}$ row. This Morton calculation can be used for each level which thus allows the same layout to advantageously scale from one level to another.

At application startup, the rendering engine 216 (FIG. 2) on the client device 112 can quickly fetch the entire collection from the server at the application provider 105 (FIG. 1) as only a relatively small amount of data from a single tile needs to be downloaded and processed for display. As the user 112 browses and zooms into particular parts of the collection, only a small amount of metadata needs to be exchanged between the client and server in order for the desired images to be accessed for rendering on the client. In this illustrative example, the metadata includes only two numbers for each thumbnail image—the Morton number which indicates the position in which the thumbnail is stored at every level, and the aspect ratio of the image.

The application uses the Morton number to locate the desired images from the tiles in the layout. The aspect ratio is used to crop the located images out of the tiles which are then handled as individual images by the rendering engine 216 on the client so that the appropriate display can be composed and rendered. The utilization of a small amount of metadata minimizes the storage requirements for collections while enhancing the user experience by minimizing application startup time and enabling the collection to be quickly retrieved and built as the user interacts with the collection.

Utilization of the Morton layout further enables changes to be handled dynamically in constant time without having to rebuild the entire collection each time a change is implemented. Changes to a collection may comprise thumbnail images being added or removed. When a new image is added to a collection, it is appended to the layout at the next available Morton number. Because the collection is multi-resolution, corresponding images, each having different sizes and resolutions, will be respectively added to each of the levels in the image pyramid. However, as noted above, a given thumbnail image will utilize the same Morton number at every level of resolution.

Figure 10:
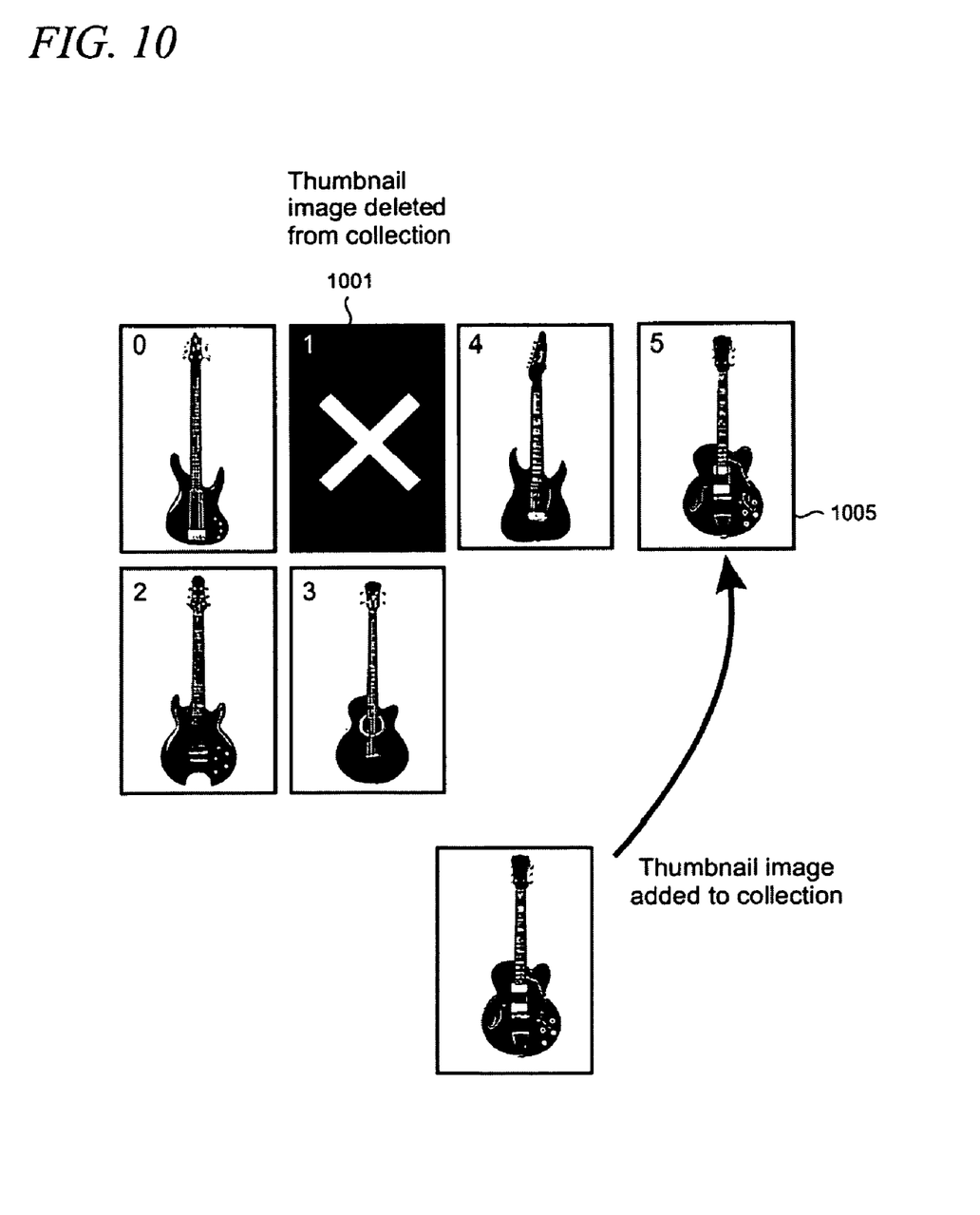
FIG. 10 shows how thumbnail images may be dynamically added or removed from a collection.

For example, as shown in FIG. 10, a new image is added to position 5 as indicated by reference numeral 1005. If an item is deleted, its position in the Morton layout is marked as being unused so that the application knows that the item is no longer part of the collection and should not be rendered as part of the display. In some implementations, depending on the applicable requirements for security, deleted items can be blacked out or otherwise obscured on a tile as illustratively shown at position 1 in the layout (as indicated by reference numeral 1001). An index may also be utilized by the application in some cases to track the images that are added to and deleted from the collection.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for storing a set of multi-resolution images as a collection in an image pyramid comprising a set of 0 to N levels, the method comprising the steps of:

arranging the multi-resolution images in a spatial layout on a first level of an image pyramid, the first level having one or more tiles on which the multi-resolution images are stored at a first resolution; and arranging the multi-resolution images in the spatial layout on a second level of the image pyramid, the second level having one or more tiles on which the multi-resolution images are stored at a second resolution, the spatial layout being configured as a fractal layout that is scalable across the first and second levels so that a spatial position for each image in the set of multi-resolution images in the collection is uniquely describable at every level using a single ordinal, the first and second levels each containing all of the multi-resolution images in the collection at different levels of resolution.

2. The method of claim 1 in which each of the tiles is stored as a separate files.

3. The method of claim 2 in which each file is formatted using an image format.

4. The method of claim 1 in which the tile's size is equal to or greater than 2N×2N bits.

5. The method of claim 1 in which the spatial layout comprises a Morton layout.

6. The method of claim 1 in which an image dimension, D, of each image in a level is D=2level number.

7. The method of claim 1 including a further step of storing the ordinal as metadata.

8. The method of claim 1 including a further step of storing an aspect ratio for each image in the set of multi-resolution images as metadata.

9. A method for dynamically modifying a texture atlas comprising a plurality of multi-resolution images, each multi-resolution image comprising at least two sub-images having different resolutions, the method comprising the steps of:

arranging the plurality of multi-resolution images in a texture atlas comprising a multi-level image pyramid, each level of the image pyramid storing the multi-resolution images at different levels of detail in one or more tiles, each texture atlas utilizing a commonly-shared fractal layout that is utilized at every level in the image pyramid and in which a given image's spatial position in the fractal layout is describable at every level using a common value; and adding a new multi-resolution image to the texture atlas by appending respective sub-images of the new multi-resolution image to each of next available free positions in the fractal layout at each level.

10. The method of claim 9 including a further step of deleting a multi-resolution image from the texture atlas by marking as open respective deleted sub-images of a multi-resolution image in the fractal layout.

11. The method of claim 10 including a further step of obscuring a deleted multi-resolution image.

12. The method of claim 9 including a further step of generating an index for tracking additions or deletions to the texture atlas.

13. The method of claim 9 in which the common value is a Morton number.

14. The method of claim 9 in which the dynamic modifying is performed without rebuilding the texture atlas.

15. The method of claim 9 in which the appending is performed in a manner so that no more than one tile at every level contains less than a fully packed texture.

* * * * *

UNITED STATES PATENT AND TRADEMARK OFFICE
CERTIFICATE OF CORRECTION

| | |
|---|---|
| PATENT NO. | : 8,385,669 B2 |
| APPLICATION NO. | : 12/397848 |
| DATED | : February 26, 2013 |
| INVENTOR(S) | : Lutz Gerhard et al. |

It is certified that error appears in the above-identified patent and that said Letters Patent is hereby corrected as shown below:

On the Title page,

Item [75] the second inventor's name delete "Adam Szoforan" and insert --Adam Szofran--.

Signed and Sealed this
Twenty-second Day of October, 2013

Teresa Stanek Rea
*Deputy Director of the United States Patent and Trademark Office*